(12) United States Patent
Howe (10) Patent No.: US 8,400,714 B2
(45) Date of Patent: Mar. 19, 2013

(54) SYSTEMS, METHODS, AND APPARATUS FOR A LIGHT REFLECTOR

(75) Inventor: Leslie D. Howe, Atlanta, GA (US)

(73) Assignee: Southpac Trust International, Inc., Trustee of the LDH Trust, Atlanta, GA (US)

(*) Notice: Subject to any disclaimer, the term of this patent is extended or adjusted under 35 U.S.C. 154(b) by 162 days.

(21) Appl. No.: 13/020,541

(22) Filed: Feb. 3, 2011

(65) Prior Publication Data
US 2011/0216420 A1 Sep. 8, 2011

Related U.S. Application Data

(60) Provisional application No. 61/311,104, filed on Mar. 5, 2010.

(51) Int. Cl.
*G02B 27/10* (2006.01)
*G02B 5/02* (2006.01)

(52) U.S. Cl. ........ 359/627; 359/640; 359/625; 359/599; 362/339; 362/558

(58) Field of Classification Search .................. 359/618, 359/619, 625, 627, 629, 638–640, 599, 707, 359/831; 362/330, 331, 339, 558, 600, 606–608, 362/613, 615, 621; 156/278, 306.8
See application file for complete search history.

(56) References Cited

U.S. PATENT DOCUMENTS

| | | | |
|---|---|---|---|
| 3,782,805 A | 1/1974 | Brown | |
| 4,052,607 A | 10/1977 | Larson | |
| 4,446,506 A | 5/1984 | Larson | |
| 4,504,888 A | 3/1985 | Rosenthal | |
| 4,594,645 A | 6/1986 | Terashita et al. | |
| 4,616,293 A | 10/1986 | Baliozian | |
| 4,633,374 A | 12/1986 | Waltz et al. | |
| 4,669,031 A | 5/1987 | Regester | |
| 4,757,425 A | 7/1988 | Waltz | |
| 4,782,428 A | 11/1988 | Lowell et al. | |
| 4,791,540 A | 12/1988 | Dreyer et al. | |
| 4,807,089 A | 2/1989 | Niissil | |
| 4,874,228 A | 10/1989 | Aho et al. | |

(Continued)

FOREIGN PATENT DOCUMENTS

| JP | 2008197166 | 8/2008 |
|---|---|---|
| KR | 1020070038832 | 4/2007 |

OTHER PUBLICATIONS

International Search Report for PCT/US2011/027322 mailed Jan. 2, 2012.

(Continued)

*Primary Examiner* — Loha Ben
(74) *Attorney, Agent, or Firm* — Troutman Sanders LLP; James E. Schutz; Mark Lehi Jones (57) ABSTRACT

Certain embodiments of the invention may include reflector systems, methods, and apparatus for providing a light reflector. According to an example embodiment of the invention, a method is provided for manufacturing a multi-layer light reflector. The method can include attaching a rear reflective layer to a lenticular lens optical film layer. The lenticular lens optical film layer includes a smooth surface and a structured surface. The rear reflective layer is disposed adjacent to or in contact with the smooth surface of the lenticular optical film. The method also includes attaching a diffusion layer to the lenticular lens optical film layer. The diffusion layer includes a smooth film surface and a structured diffusing surface. The smooth film surface of the diffusion film is disposed adjacent to or in contact with the structured surface of the lenticular lens optical film.

23 Claims, 7 Drawing Sheets

U.S. PATENT DOCUMENTS

| | | | |
|---|---|---|---|
| 4,911,529 A * | 3/1990 | Van De Ven | 359/454 |
| 5,023,756 A | 6/1991 | Regester | |
| 5,055,976 A | 10/1991 | Arai | |
| 5,115,384 A | 5/1992 | Loth et al. | |
| 5,132,885 A | 7/1992 | Hocheim | |
| 5,154,503 A | 10/1992 | Sternsher | |
| 5,224,770 A | 7/1993 | Simmons et al. | |
| 5,235,497 A | 8/1993 | Costa | |
| 5,295,221 A | 3/1994 | Roslan | |
| 5,296,965 A | 3/1994 | Uetsuki et al. | |
| 5,373,422 A | 12/1994 | Hodkinson | |
| 5,436,804 A | 7/1995 | Henry | |
| 5,483,424 A | 1/1996 | Lightbody | |
| 5,556,186 A | 9/1996 | Pilby | |
| 5,651,602 A | 7/1997 | Tawil et al. | |
| 5,780,140 A | 7/1998 | Nilsen | |
| 5,837,346 A | 11/1998 | Langille et al. | |
| 5,841,146 A | 11/1998 | Briese | |
| 5,890,793 A | 4/1999 | Stephens | |
| 5,903,392 A | 5/1999 | Kojima et al. | |
| 6,030,087 A | 2/2000 | Whittle | |
| 6,052,164 A * | 4/2000 | Cobb et al. | 349/64 |
| 6,109,757 A | 8/2000 | Stephens | |
| 6,130,777 A * | 10/2000 | Yamashita et al. | 359/456 |
| 6,176,598 B1 | 1/2001 | Selligman et al. | |
| 6,234,638 B1 | 5/2001 | Beverly | |
| 6,322,235 B1 | 11/2001 | Strobel | |
| 6,354,709 B1 * | 3/2002 | Campbell et al. | 362/627 |
| 6,412,967 B2 | 7/2002 | Geller | |
| 6,422,709 B1 | 7/2002 | Panagiotou | |
| 6,513,955 B1 | 2/2003 | Waltz | |
| 6,574,041 B1 | 6/2003 | Chen | |
| 6,709,121 B1 | 3/2004 | Lowe et al. | |
| 6,724,529 B2 | 4/2004 | Sinkoff | |
| 6,825,984 B2 * | 11/2004 | Kashima et al. | 359/599 |
| 6,842,282 B2 | 1/2005 | Kuroda et al. | |
| 6,893,135 B2 | 5/2005 | Wright et al. | |
| 7,057,812 B2 | 6/2006 | Sinkoff | |
| 7,075,718 B2 | 7/2006 | Suzuki et al. | |
| 7,077,534 B2 | 7/2006 | Harlocker | |
| 7,158,300 B2 | 1/2007 | Shimoda | |
| 7,164,836 B2 | 1/2007 | Wright et al. | |
| 7,221,508 B2 | 5/2007 | Marutu et al. | |
| 7,229,180 B2 | 6/2007 | Prtmann | |
| 7,234,843 B2 | 6/2007 | Regester et al. | |
| 7,246,925 B2 | 7/2007 | Waltz et al. | |
| 7,349,154 B2 | 3/2008 | Aiura et al. | |
| 7,470,044 B2 | 12/2008 | Maes | |
| 7,495,828 B2 | 2/2009 | Ishii | |
| 7,553,059 B2 | 6/2009 | Kuroda et al. | |
| 7,573,550 B2 * | 8/2009 | Lubart et al. | 349/113 |
| 7,597,461 B2 | 10/2009 | Laney et al. | |
| 7,633,677 B2 | 12/2009 | Niwa et al. | |
| 7,679,823 B2 | 3/2010 | Etori | |
| 7,898,520 B2 * | 3/2011 | Freier | 345/102 |
| 2006/0171164 A1 | 8/2006 | Kida | |
| 2008/0136994 A1 | 6/2008 | Lee | |
| 2009/0161345 A1 | 6/2009 | Hsu | |
| 2009/0201441 A1 | 8/2009 | Laney et al. | |
| 2010/0097699 A1 | 4/2010 | Destain et al. | |

OTHER PUBLICATIONS

International Search Report for PCT/US2011/027280 mailed Oct. 18, 2011.

PCT/US2011/027280 International Preliminary Report on Patentability.

PCT/US2011/027322 International Preliminary Report on Patentability.

* cited by examiner

FIG. 1

(Prior Art)

SYSTEMS, METHODS, AND APPARATUS FOR A LIGHT REFLECTOR

RELATED APPLICATIONS

This application claims the benefit of provisional patent application Ser. No. 61/311,104 filed Mar. 5, 2010, the contents of which are incorporated herein by reference in its entirety, as if set forth in full.

FIELD OF THE INVENTION

This invention generally relates to light reflection, and in particular to light reflecting systems.

BACKGROUND OF THE INVENTION

Light reflectors or reflection devices are utilized in many applications, and are particularly useful for directing light in applications including video recording, motion picture filming, television, etc. Light reflectors may also be utilized in projection applications. Movie projection screens, for example, are often made with a material designed to enhance the reflected brightness and other qualities of the projected image.

In the field of studio lighting, light reflection devices typically reflect or bounce light from a source and towards a subject, or towards portions of the scenery. Reflectors are typically separated from a light source and may be used for controlling shadows, highlights, and/or the effective size of the main light source. For example, a reflector positioned a certain distance away from a light source may accept light from the source and may effectively increase the beam diameter incident on the subject by effectively increasing the separation between the light source and the subject.

Unmodified direct light from light bulbs or direct mid-day sunlight may be described as a specular point source, where the light rays striking the intended subject may predominantly come from a single direction and may cause pronounced shadows, highlights and contrast. This may be known as "hard" light in the industry. Hard light may be sometimes desirable to achieve certain looks and effects in photography, however, in general, a more diffused or "soft" light source may be needed. Soft light refers to light that may tend to "wrap" around objects, casting shadows with soft edges and lowering the contrast and highlights.

Many types of reflection surfaces are used in studio lighting. One type may be a basic white panel typically made from matt or satin finish paper products, such as card stock, foam core board, bristle board etc. Such reflection surfaces are considered diffuse because they exhibit an almost lambertian distribution of reflected light rays. In the projection screen industry, a surface covered with titanium dioxide or magnesium carbonate may have similar reflection characteristics to matt white paper, and may be a reference standard for light reflection, distribution pattern, and/or viewing angles.

Other white reflection surfaces with characteristics similar to that of paper products may be used, including white vinyl, nylon, synthetic fabrics etc. Typically, the white surfaces tend to reflect the visible spectrum wavelengths evenly without discernable shifts in color.

Although light reflected from the previously described types of white reflection surfaces may exhibit a very soft and neutral quality that may be very useful in many studio lighting situations, such materials may suffer from low reflection efficiency. For example, the reflected light may need to be of sufficient brightness to have the desired effect, which may necessitate either that the size of the reflection surface be increased or the reflection surface be moved closer to the intended subject. Situating the reflector surface close enough to the intended subject to have the desired affect may be difficult or not possible, as it may be visible in the shot or otherwise obtrusive. A larger reflecting surface may also suffer from the same problem, and the large physical size may be inconvenient and undesirable on a location. Additionally, larger reflection surfaces may require larger and heavier frames for mounting.

Another drawback associated with previously described reflection surfaces is that the reflected light tends to be extremely homogenous or "flat". Flat lighting may be lighting that produces very little contrast on the subject, with a minimum of shadows. For example, flat lighting might be similar to light on an overcast day, and could be described as dull and non-dynamic.

Another type of reflecting surface which may be widely used in studio lighting is white synthetic fabric which may be blended with metallic fibers or metallic coatings, which may give a more specular or harder mirror like reflection. This type of reflection surface may offer a mix of white and metallic in different ratios and patterns, such as a "zebra pattern" which may have alternating bands of white and metallic, to fully metallic. Typically, the metallic patterns may be silver or gold colored. Such materials may reflect higher levels of light towards the intended subject due to the specular mirror like characteristics; however, such materials may cast harsh unpleasing highlights or "hotspots" on the intended subject, especially when used with a hard light source such as the direct sun.

Figure 1:
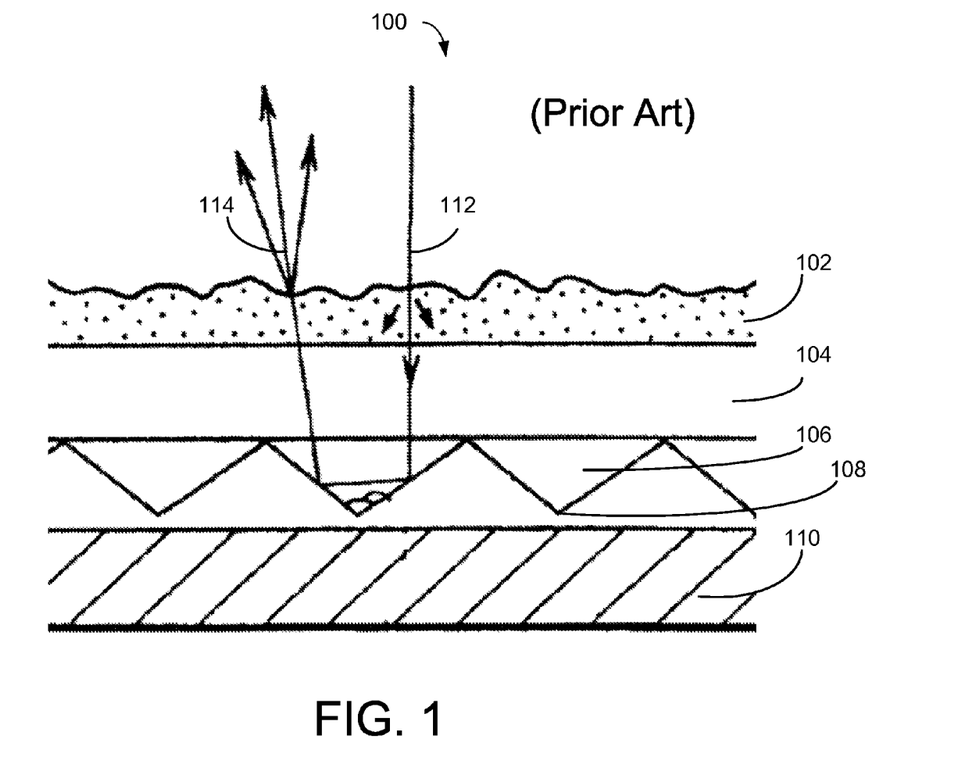
FIG. 1 depicts a prior art reflection surface.

A prior art reflection screen as described in U.S. Pat. No. 5,903,392 to Kojima et. al., is shown in FIG. 1. The intended application is for use as a front projection screen, and the screen includes a first sheet 102, which may contain a diffusion coating formed on the top of a clear substrate 104, and a layer of prisms 106 formed beneath clear substrate 104. The triangular prisms 106 are arranged such that their bottom sides lie on the substrate 104 (i.e., the prism apexes 108 face the back of the reflection screen). The axis of alignment of the prisms may extend in a direction perpendicular to the horizontal viewing plane. Disposed beneath layer of prisms 106 is a black absorbing second sheet 110.

The prior art reflection screen 100 may suffer from several drawbacks: The black absorbing second sheet 110, for example, may absorb most of the light that is refracted through the prism layer 106. Thus, the reflection screen exhibits relatively low reflectance. Furthermore, since the prism apexes 108 face the rear surface 110, when the prism apex is approximately 90 degrees, the light incident on the screen from a given incident angle will be reflected in a direction opposite of the incident angle. As shown in FIG. 1, the incident light ray 112 may be incident on the reflection screen 100 at an approximate angle normal to the rear surface 110, while the reflected light ray(s) 114 may exit the reflection screen 100 at angles similar to that of the incident light ray 112. This may create a mirror like reflection or "hotspot" when the screen is viewed from an angle close to the angle of the incident light. This specular hot spotting may make the reflection characteristics unsuitable for use in most applications. The prior art U.S. Pat. No. 5,903,392 teaches that the prism apex angle should be between 90 degrees and 100 degrees to avoid the hotspot drawback. However, the tooling and manufacturing costs of a customized optical sheet that has a diffusion layer on one side and a prism sheet with non standard (i.e., angles other than 90 degrees) prism apex angles, especially on the large format sizes that would be required for most projection screens, may be prohibitively expensive.

Figure 2:
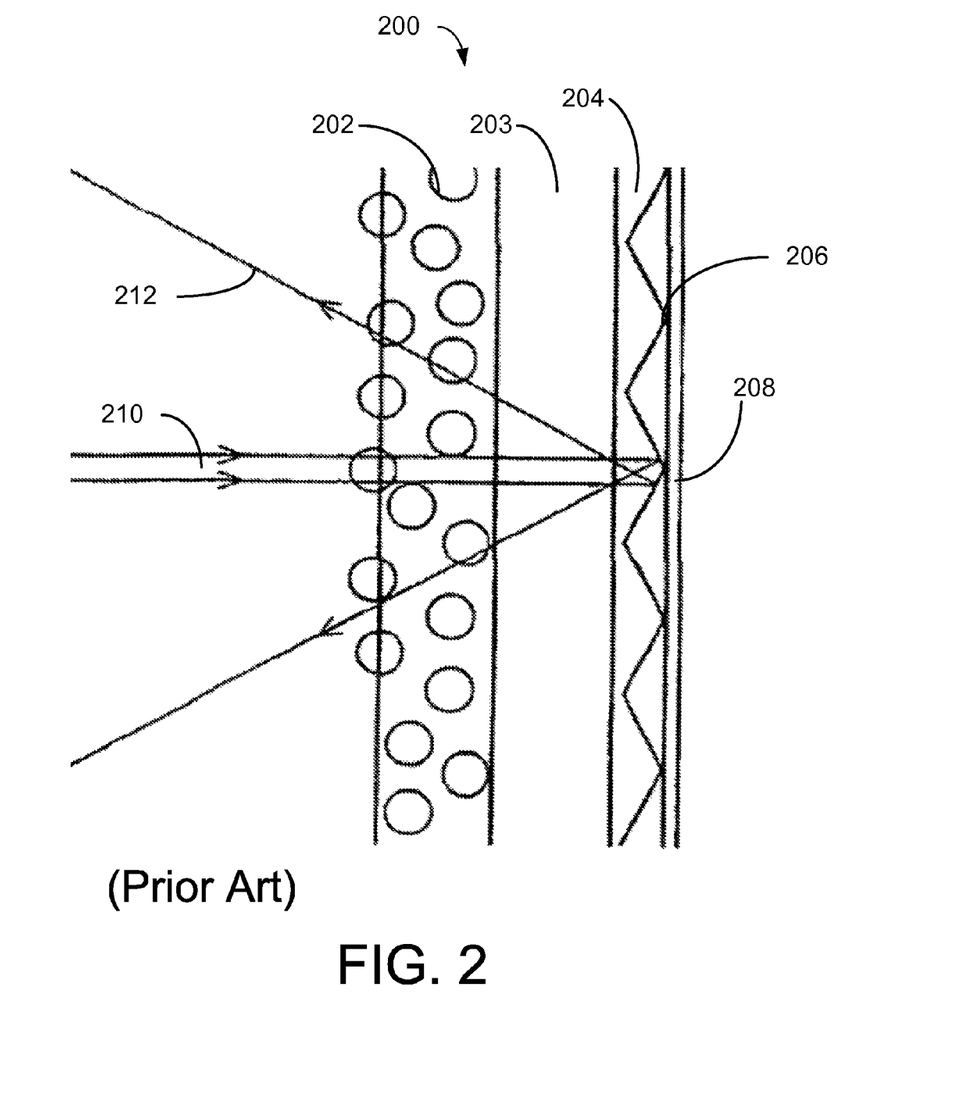
FIG. 2 depicts another prior art reflection surface.

Another prior art reflection screen described in U.S. Pat. No. 7,349,154 B2 to Tomoyuka et. al., is shown in FIG. 2. The intended application for this reflection screen 200 is for a front projection screen. The reflection screen 200 includes a top diffusion layer 202, a transparent resin sheet 203, which may be laminated to the bottom surface of the diffusion layer 202, and a prism layer 204 with triangular prisms arranged such that the prism apexes 206 face the back of the reflection screen. The axis of alignment of the prisms may extend in a direction that may be perpendicular to a horizontal viewing plane. Disposed beneath the prism sheet 200 may be a reflection layer 208 or "mirror" layer, which may be made from vacuum depositing or sputtering of aluminum or silver on the prism surface. Due to the arrangement of the prism layer, this reflection screen may also suffer drawbacks similar to those discussed above with respect to the U.S. Pat. No. 5,903,392. For example, for 90-degree prism apexes 206 that face the rear surface 208, light incident on the screen from a given incident angle will be reflected in a direction opposite of the incident angle. This may create a minor like reflection or "hotspot" when the screen is viewed from an angle close to the angle of the incident light. Furthermore, the use of a highly specular minor-like reflecting surface 208 may increase the specular component of light reflected from the reflection screen 200, which may increase undesirable hotspotting. FIG. 2 depicts incident light rays 210 entering a bottom side of the prism layer 204 and may be reflected as shown by the reflected light rays 212.

There has long been a need for a reflection surface for studio lighting that may have the qualities of soft, diffuse and neutral qualities of a white reflection surface, and which may be also capable of directing the level of light to the intended subject comparable to that of a metallic blended reflection surface, but without the harsh specular components. There also has long been a need for a high reflectance projection screen surface that may exhibit exemplary qualities, yet may be cost effective to manufacture.

BRIEF SUMMARY OF THE INVENTION

Some or all of the above needs may be addressed by certain embodiments of the invention. Certain embodiments of the invention may include systems and methods for a light reflector.

According to an example embodiment of the invention, a method is provided for manufacturing a multi-layer light reflector. The method can include attaching a rear reflective layer to a lenticular lens optical film layer. The lenticular lens optical film layer includes a smooth surface and a structured surface. The rear reflective layer is disposed adjacent to or in contact with the smooth surface of the lenticular optical film. The method also includes attaching a diffusion layer to the lenticular lens optical film layer. The diffusion layer includes a smooth film surface and a structured diffusing surface. The smooth film surface of the diffusion film is disposed adjacent to or in contact with the structured surface of the lenticular lens optical film.

According to an example embodiment of the invention, a light reflector is provided. The light reflector includes a rear reflective surface and a lenticular lens optical film. The lenticular lens optical film includes a smooth surface and a structured surface. The smooth surface of the lenticular lens optical film is attached or disposed adjacent to the rear reflective surface. The light reflector also includes a diffusion film. The diffusion film includes a smooth film surface and a structured diffusing surface. The smooth film surface of the diffusion film is attached or disposed adjacent to the structured surface of the lenticular lens optical film.

According to another example embodiment, a light reflector system is provided. The light reflector includes a film stack that may include a rear reflective surface. The film stack may also include a lenticular lens optical film having smooth surface and a structured surface, where the smooth surface of the lenticular lens optical film is attached or disposed adjacent to the rear reflective surface. The film stack may also include a diffusion film. The diffusion film includes a smooth film surface and a structured diffusing surface. The smooth film surface of the diffusion film is attached or disposed adjacent to the structured surface of the lenticular lens optical film. The light reflector system may also include a film-tensioning frame operable for mounting the film stack and providing tension to the film stack.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention, however, may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable a light reflector. According to an example embodiment, incident light may interact with the reflector, and may first encounter a diffusion film. According to an example embodiment, the incident light may first encounter a structured, diffusing, and/or non-glossy surface associated with the diffusion film. In an example embodiment, the outer surface of the diffusion film may be a matte finish (non-glossy) to avoid mirror-like or specular reflections from the light source. According to an example embodiment, the diffusion film may be disposed adjacent to, or attached to a structured side of a prismatic optical film. According to example embodiments of the invention, the structured surface of the prismatic optical film may include a plurality of triangular prisms arranged such that that the apex of the prisms may face towards the incident light, and/or towards the back surface of the diffusion film (which may be smooth or structured). According to certain example embodiments, the prismatic optical film may include a smooth back surface that may be disposed adjacent to, or attached to a rear reflective surface.

Example embodiments of the reflector may function both as a diffuse light reflector and as a light recycling cavity ("LRC"). A LRC, for example, may be used in a backlight application in an LCD display. However the LRC, according to example embodiments of the invention, differs from a traditional backlight in that traditional backlight designs may have a light source which may be either disposed directly behind the output surface (for example, as in a direct lit configuration) or disposed along the outside edges (for example, as in an edge lit configuration). According to example embodiments of the invention, the light source may be the light incident on the reflector, and the incident light may enter the LRC via refraction through the top structured surface of the prism film.

Figure 3:
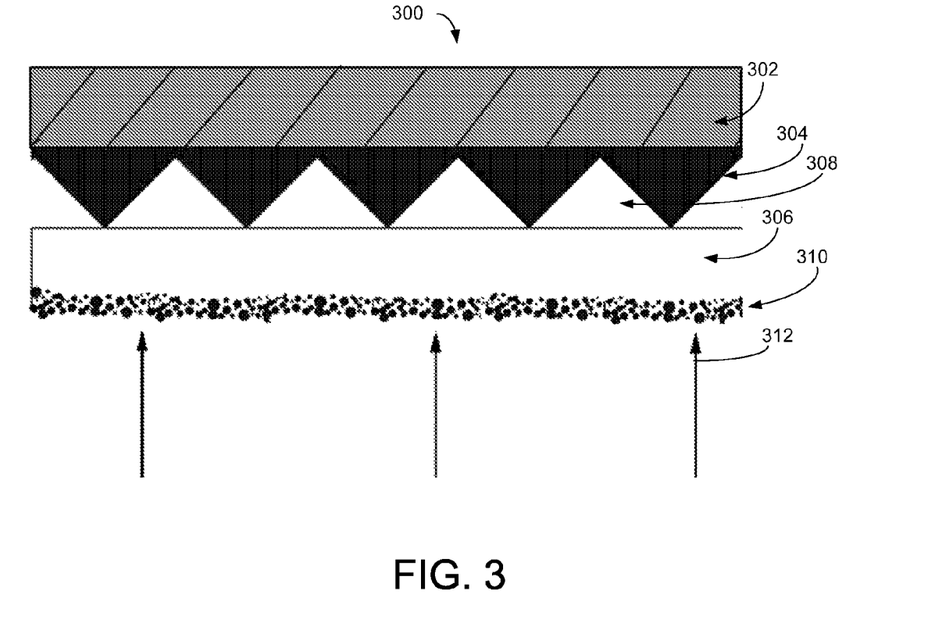
FIG. 3 shows a cross sectional view of the reflector, according to an example embodiment of the invention.

Referring now to an example embodiment of the reflector 300 depicted in FIG. 3, the LRC of the reflector 300 may include a rear reflective surface 302 with high diffuse reflectance characteristics. According to an example embodiment, the LRC of the reflector 300 may include a prismatic optical film 304 with the prism apexes facing the incident light 312. According to an example embodiment, the reflector 300 may include a diffusion film 306. In an example embodiment, the diffusion film 306 may include a textured, structured or otherwise diffusing surface 310. In an example embodiment, the diffusion film 306, the prismatic optical film 304, and the rear reflective surface 302 may be disposed or sandwiched in intimate contact with one another and may have no obvious air cavities therein between, except for the air or dielectric cavities between the prism rows 308, but may still form a recycling cavity.

In accordance with example embodiments, incident light 312 from an external source may initially enter the diffusion film 306, which may act to diffuse the incident light 312. In an example embodiment, the incident light 312 may interact with the structured portion 310 of the diffusion film 306 and a small proportion of the incident light 312 may be reflected, in a mostly diffused, lambertian distribution pattern. According to an example embodiment of the invention, the diffusion film 306 may exhibit a haze rating of approximately 45% to approximately 70%. According to example embodiments of the invention, levels of diffusion may be adjusted to increase or decrease the overall diffuse and specular reflectance ratio of the reflector 300.

In accordance with an example embodiment of the invention, the diffusion film may exhibit low gloss characteristics to avoid specular "mirror like" reflections that may increase as the level of gloss increases. Companies such as Kimoto Tech and Keiwa Inc. manufacture diffusion films specifically designed for use with prism film, however, such films may be intended for incident light entering the smooth (un-structured) rear side of the film, and the gloss level of the structured surface of the film may be not specified. In accordance with example embodiments of the invention, appropriate levels of gloss and haze may be found through trial and error.

Gloss is associated with the capacity of a surface to reflect more light in directions close to specular than in other directions. Measured gloss ratings by the ASTM D523-08 Standard Test Method for Specular Gloss, for example, may be obtained by comparing the specular reflectance from the specimen to that from a black glass standard. Since specular reflectance depends also on the surface refractive index of the specimen, the measured gloss ratings change as the surface refractive index changes. In obtaining the visual gloss ratings, however, it is customary to compare the specular reflectances of two specimens having similar surface refractive indices.

Other visual aspects of surface appearance, such as distinctness of reflected images, reflection haze, and texture, are frequently involved in the assessment of gloss. Test Method E 430 includes techniques for the measurement of both distinctness-of-image gloss and reflection haze. Test Method D 4039 provides an alternative procedure for measuring reflection haze. Little information about the relation of numerical-to-perceptual intervals of specular gloss has been published. However, in many applications the gloss scales of this test method have provided instrumental scaling of coated specimens that have agreed well with visual scaling. When specimens differing widely in perceived gloss or color, or both, are compared, nonlinearity may be encountered in the relationship between visual gloss difference ratings and instrumental gloss reading differences.

According to an example embodiment of the invention, a "smooth" surface may be defined by the Rayleigh criterion:

$$h < \frac{\lambda}{8\cos(\theta)},$$

where h is the height of surface bumps, $\lambda$=the light wavelength, and $\theta$=the angle of the incident light with respect to the bulk normal of the surface. Example embodiments of the invention may include certain surfaces having low gloss, or Lambertian scattering properties, which may be approximately related to the surface roughness defined as:

$$h > \frac{\lambda}{8\cos(\theta)}.$$

In accordance with an example embodiment, a high percentage of the incident light 312 may refract through the diffusion film 306, and strike the structured surface of the prismatic optical film (304). A small portion of light striking the structured surface of the prismatic optical film may be reflected backwards towards the incident light (312) through the diffusion film (306), and exiting the reflector (300). The majority of the light striking the structured surface of the prismatic optical film will be refracted through it, and thus entering the LRC.

Figure 4:
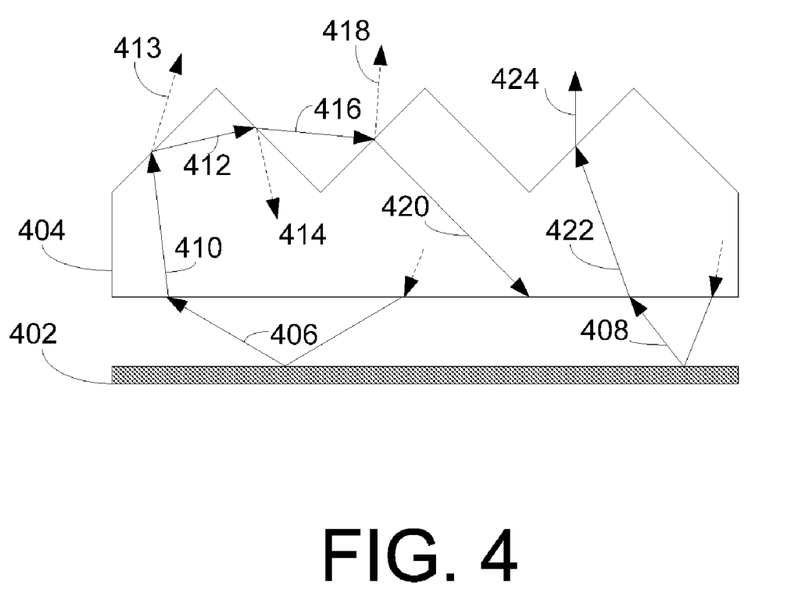
FIG. 4 depicts a back reflector and a prismatic optical layer, according to an example embodiment of the invention.

FIG. 4 depicts an example cross sectional view of an example prismatic optical film. The prismatic structure may be embossed on one surface of a plastic substrate 404. According to an example embodiment, the prisms may be aligned in a directional axis with respect to the plane of the plastic substrate 404. In an example embodiment, the prismatic films may be utilized to redirect off-axis light to an output direction that is closer to the normal axis of the output surface. In an example embodiment, the prismatic film may reflect relatively on-axis light incident on the bottom surface (non structured side) and recycle this light backwards into the LRC, while refracting off axis light through the top surface generally in the direction of the normal axis of the output surface. In said example, approximately 50% of the light incident on the bottom surface of a single prism film may be recycled. According to example embodiments, the light rays may make many reflections within the surfaces of the LRC before finally being refracted through the output surface, thus scattering and "mixing" the light. According to an example embodiment of the invention, the percentage of light loss from all of the internal reflections, including reflections off the reflector material 402, may be extremely low, and therefore, the overall light loss may be very low and the light output efficiency of the LRC may be high.

FIG. 4 also depicts example light ray interaction with the prism film. In this example depiction, a gap is shown between the back reflector surface 402 and the smooth side of the prismatic film 404 for the purpose of depicting light ray reflection angles. According to example embodiments of the invention, the back reflector surface 402 may simply be held in contact with the prismatic film 404 (for example, around the edges of the film layers) without specifically controlling the size or uniformity of the air gap therein between. According to other example embodiments, the air gap size and uniformity may be controlled. For example, in one embodiment, spacers may be utilized around the perimeter of the film layers to provide a certain air gap distance. According to an example embodiment, the back reflector surface 402 may be in intimate contact with the smooth side of the prismatic film 404. In an example embodiment, an index matching material or adhesive may be disposed between the back reflector surface 402 and the smooth side of the prismatic film 404. In an example embodiment, an index matching material or adhesive may be disposed between the back reflector surface 402 and the smooth side of the prismatic film 404. In another example embodiment, the prismatic film 404 may integrated with the back reflector surface 402 and embossed or otherwise textured. In another example embodiment, the prismatic film 404 may be metallized (for example, via vacuum metal deposition) to create the back reflector surface 402 in intimate contact with the smooth side of the prismatic film 404. However, directly creating a mirrored surface on the smooth (non-structured) side of the prismatic film can create specular reflections and "hot spots" as discussed previously. Therefore, according to an example embodiment, the smooth (non-structured) side of the prismatic film may be treated or otherwise manufactured to have a non-smooth or matte finish so that any subsequent metallization reflecting layer may have a high diffuse reflectance.

According to an example embodiment, an off-axis ray 406 may be reflected from the reflector surface 402 and may be incident on the non-structured (or non-embossed) surface of the plastic substrate 404. According to Snell's Law, the internal ray 410 may be refracted towards the normal of the plane of the plastic substrate at the first air-film boundary due to the higher refractive index of the film, which may have an index of refraction of approximately n=1.5. Depending on the angle of incidence of initial off-axis reflected ray 406, the refractive index of the film 404, index matching within the gap between the back reflector 402 and the prismatic film 404, and the polarity of the incident light electromagnetic field, the internal ray 410 may be transmitted 413 and/or reflected 412 at the second film-air boundary. The reflected 412 portion of the light may encounter a third film-air boundary where it may internally reflect 414 back into the film for recycling, or it may transmit 416 across the film-air boundary, and may encounter an adjacent prism. The ray may then reflect 418 from the prism surface to the output, or it may transmit 420 back into the film, where it may be recycled.

According to an example simplified embodiment, another off-axis ray 408 may be reflected from the reflector surface 408, and may be refracted 422 towards the normal of the first air-film boundary. In an example embodiment, the refracted 422 ray may encounter the film-air boundary and may be transmitted 424 to the output, if the angle of incidence upon the film-air boundary exceeds the critical angle for total internal reflection.

According to example embodiments, the illumination output angle may be condensed in the direction perpendicular to the plane of the axis of alignment of the prism arrays and/or slightly condensed in the plane parallel to the axis of alignment. In an example embodiment, the axis of alignment in the horizontal direction may produce an illumination output angle that is primarily condensed in the vertical direction, with a slight condensation in the horizontal direction.

According to an example embodiment, light collimation or light condensing (along the vertical and/or horizontal direction) by the prism film may have the effect of increasing the relative output levels of the light exiting the film in the direction normal to the surface of the film. In a theoretically "ideal" light recycling cavity, the "ideal" light output along an axis normal to the surface of the film can be as high as 70% or more compared to the a light source without the prism films in place.

According to example embodiments of the invention, the back surface of the reflector may be the reflection film 302, which may serve as the back panel of the LRC. In an example embodiment, the reflection film 302 may be a white reflecting material that has high overall reflectivity, (for example, over 95% efficient), and may also have diffuse reflectance of over 95%. One such example product includes foamed microcellular PET (Polyethylene Terephthalate) plastic sheets such as the Ref White series by Kimoto Tech. An aluminum or silver reflection material such as that used in the previously described prior art from Kojima et. al., might have only a 10% diffuse reflectance value and a 85% specular value. Such specular reflection materials may be relatively ineffective at increasing light scattering within the LRC. According to example embodiments of the invention, maximizing light scattering within the LRC may be best served by reflecting materials that have the highest amount of diffuse reflectance possible.

In accordance with example embodiments of the invention, the portion of light within the LRC that strikes the bottom surface of the prism film 304 and is reflected within the required angles of the prism film to be refracted subsequently may exit the prism film 304. The reflected light may have a condensed dispersion pattern, and may pass through the diffusion film 306, becoming further diffused, and finally may exit the reflection surface through the top structured surface 310 of the diffusion film 306.

The description of the optical films in this disclosure may be intended to show functional aspects of the reflection surface using those films as an example. However, there may be many options for optical films available on the market which may potentially exceed the performance of the films in the illustrated examples, or which may reduce the total number of films required. For example, films may be available that combine the operation of prism films and a diffuser into one film. Other possible options for light management films may be available which may perform similar functions as the examples described herein, some of which may exceed operational performance of the example films, or which may be more cost effective to use. Furthermore, in certain example embodiments, lenticular lens films may be utilized. For example, lenticular lens films may have structured surfaces that may increase certain aspects of the reflectors performance. Therefore, example embodiments of the invention may utilize all known types of light management films that may be appropriate to the function and usage of the reflector.

Embodiments of the invention, when applied as a reflector for studio lighting, may produce light output that may be relatively soft and diffuse, yet may contain just enough specular reflected components to add a pleasing amount of highlights to the subject without casting any specular hot spots, even when reflecting direct sunlight. Thus, example embodiments of the invention may have the technical effects of being a reflector that produces even diffusion similar to that of a white type reflector typically used in studio lighting, but without the flat, dull or un-dynamic qualities. Furthermore, embodiments of the invention may have the technical effects of producing reflected light output level comparable to the previously described reflectors typically used in studio lighting, which have a mixture of metallic fibers or coatings, but may not exhibit the harsh specular hot spots of said typical reflectors. Embodiments of the invention may result in a light reflector having the technical effect of producing reflected output that may be approximately 80% greater than that of a white type reflector typically used in studio lighting.

According to an example embodiment, when the axis of alignment of the prism axis is in the horizontal plane, an example reflector may have the half brightness dispersion pattern of approximately 90 degrees horizontally, and 65 degrees vertically. When used as a studio lighting reflector, it may be rotated such that the dispersion pattern may be aligned to a position best suited for the lighting requirements of the intended subject.

The reflector, as described in example embodiments, may also be advantageous for use as a projection screen surface. According to example embodiments, the reflector may allow a gain of approximately 1.8 as compared with a standard reference surface, and may still maintain a large half-brightness viewing angle of approximately 90 degrees in the horizontal viewing plane. Additionally, an example embodiment of the invention may exhibit minimal hot spotting, excellent contrast characteristics and minimal perceptible color shift of the reflected image, which tends to be a problem with many high gain projection screens currently on the market.

The types of diffusion film, prismatic optical film, and reflection film described in example embodiments may be used in large format televisions, among other applications, and may be therefore mass-produced with competitive pricing advantages, and may potentially eliminate the high costs of custom optical film manufacturing.

Figure 5:
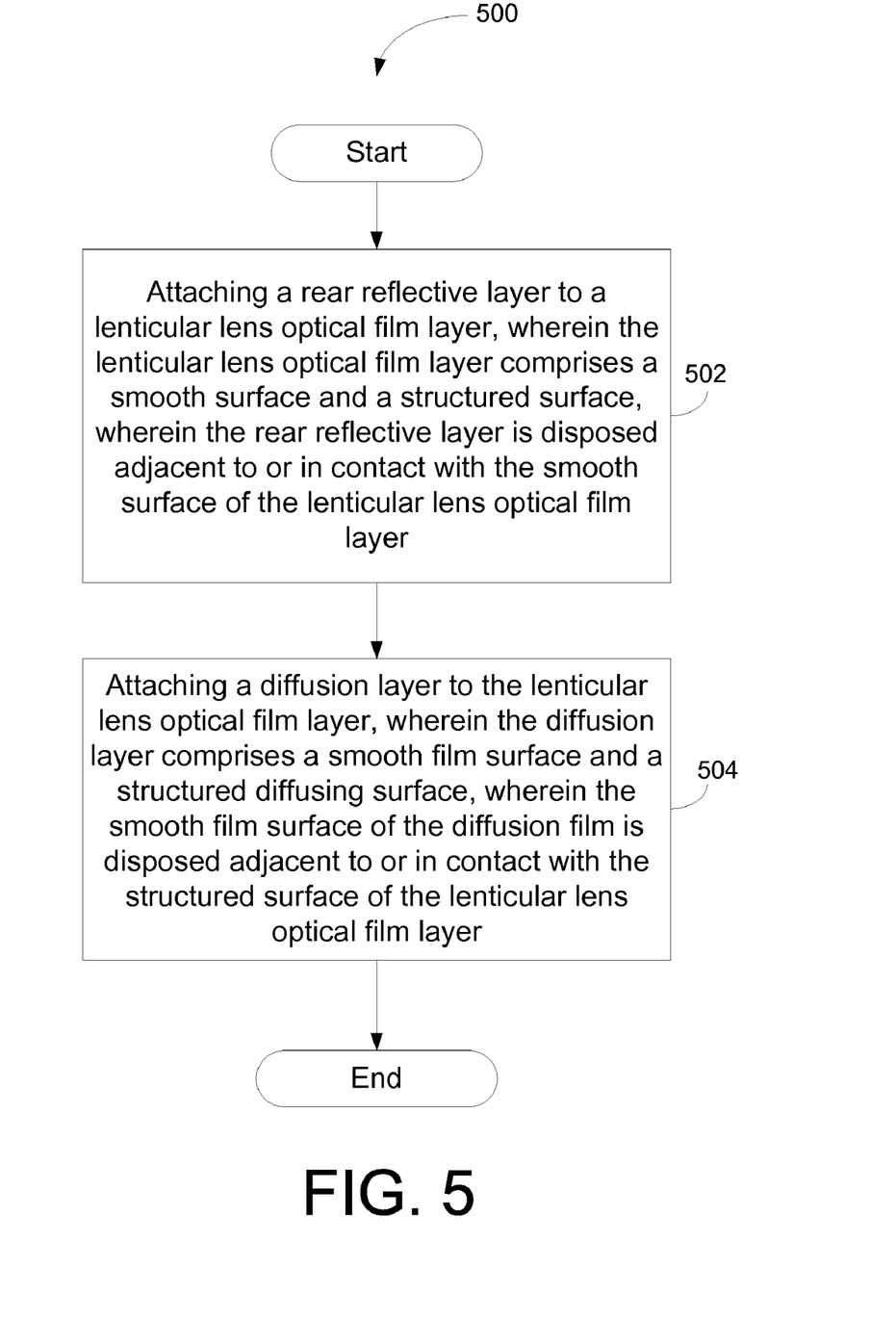
FIG. 5 shows a method, according to an example embodiment of the invention.

An example method 500 for manufacturing a multi-layer light reflector will now be described with reference to the flowchart of FIG. 5. The method 500 starts in block 502, and according to an example embodiment of the invention, includes attaching a rear reflective layer to a prismatic optical film layer, wherein the prismatic optical film layer comprises a smooth surface and a structured surface, wherein the structured surface comprises a plurality of triangular prisms, and wherein the rear reflective layer is disposed adjacent to or in contact with the smooth surface of the prismatic optical film. In block 504, and according to an example embodiment, the method 500 includes attaching a diffusion layer to the prismatic optical film layer, wherein the diffusion layer comprises a smooth film surface and a structured diffusing surface, wherein the smooth film surface of the diffusion film is disposed adjacent to or in contact with the structured surface of the prismatic optical film. The method 500 ends after block 504.

Figure 6:
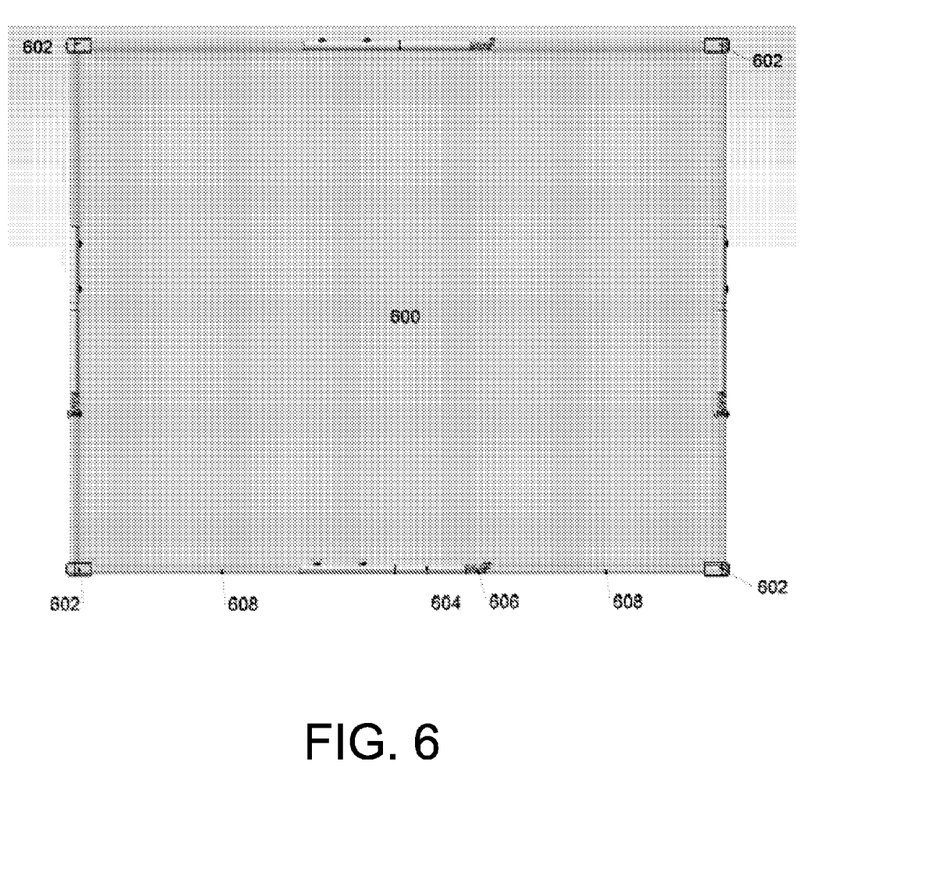
FIG. 6 depicts a frame and holder for the reflector, according to an example embodiment of the invention.
Figure 7:
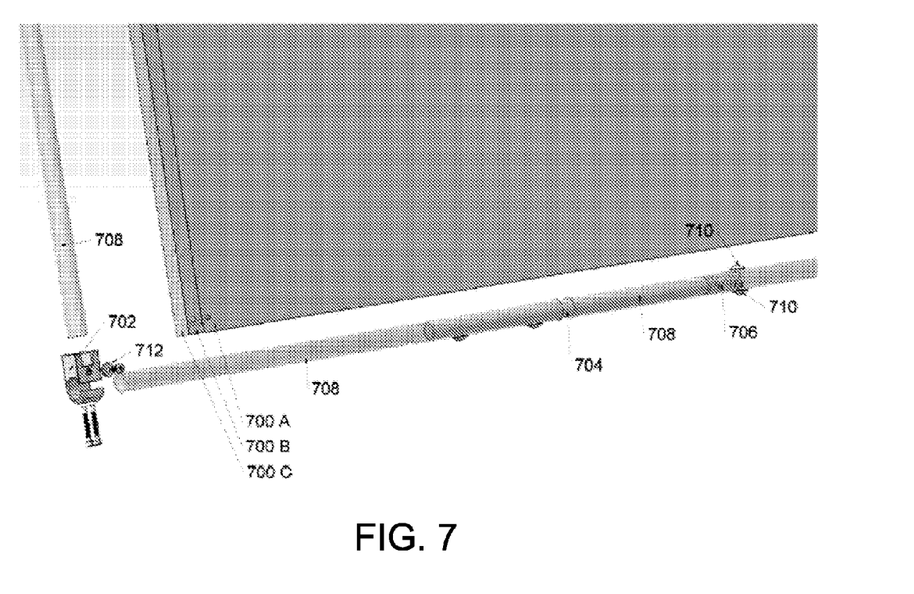
FIG. 7 depicts another view of a frame and holder for the reflector, according to an example embodiment of the invention.

In an example embodiment, the reflector film stack may be mounted on a film-tensioning frame as shown in FIG. 6 and FIG. 7. FIG. 6, for example, shows a rear perspective of the film-tensioning frame. In an example embodiment, the reflector film stack 600 may be mounted on a four sided frame. According to an example embodiment, each side of the frame may include two frame members 608, which may be under tensional force from a spring 606. In an example embodiment, the frame members 608 may be attached to a sliding inner frame member 604 disposed approximately at the center point of the frame side. In an example embodiment, the other half of the inner sliding frame member 604 may be allowed to slide freely inside one of the frame members 608. Frame members 608 may be connected at each corner with corner frame connectors 602.

FIG. 7 depicts a three dimensional exploded close-up view of one corner associated with the film-tensioning frame. In an example embodiment, diffusion film 700A, prism film 700B, and reflector film 700C may form a multi-layer film stack and may be secured to the frame connector 702 via a film retention screw and washer 712 that may pass though corner holes in each of the film layers. In an example embodiment, the frame connector 702 may attach to a one end of a frame member 708. The other end of the frame member 708 may attach to one end of a sliding inner frame member 704. In an example, the other end of the sliding inner frame member 704 may be in contact with a spring 706. In an example embodiment, the spring 706 may be held in place by a spring retaining screws 710. In an example embodiment, when both frame members 708 are manually pushed together, tensional force is created along the axis of the frame members. According to an example embodiment, two opposing sides of the frame may be secured to the frame connectors 702 with screws, and the other two sides can be compressed, and inserted into the frame connectors 702 and may be held in place by tensional force once the compression force is released. According to an example embodiment, when each frame side is released from its fixed compressed state, tension of sufficient amount may be present across the reflector film stack 700A, 700B, 700C to cause the reflector film stack to be suitably and adequately suspended across the frame.

In an example embodiment, the springs 706 may be eliminated, and instead, adjustable frame tensioners may be used. Such adjustable tensioners may comprise a threaded insert, which may fit into the frame member 708 approximately in the same position as the former springs 706 described previously. In an example embodiment, the threaded insert may include a bolt, which when turned, may exert force against a shim (not shown) and sliding inner frame member 704, thus creating outward tension along the axis of the frame side. In an example embodiment, the bolt may be adjusted through an opening in the frame member 708.

As desired, embodiments of the invention may include the multilayer reflector system with more or less of the layers or components as illustrated in FIGS. 3, 4, 6, and 7. In accordance with example embodiments of the invention, the light reflector may include a rear reflective surface. The rear reflective surface may include a lenticular or prismatic optical film having a smooth surface and a structured surface. In an example embodiment, the structured surface may include a plurality of triangular prisms. In an example embodiment, the lenticular lens structured surface may include a plurality of raised ridges, or shaped features, according to the desired properties. In an example embodiment, the smooth surface of the lenticular or prismatic optical film is attached or disposed adjacent to the rear reflective surface. In an example embodiment, the light reflector may also include a diffusion film having a smooth film surface and a structured diffusing surface, wherein the smooth film surface of the diffusion film is attached or disposed adjacent to the structured surface of the lenticular or prismatic optical film.

Example embodiments of the light reflector may include rear reflector having reflectivity specifications with a total reflectance value of 90% or greater and a diffuse reflectance value of 90% or greater. Example embodiments of the invention may include a lenticular lens optical film having a plurality of triangular prisms. Certain example embodiments of the light reflector may include a rear reflective surface including a metal or a metalized surface. Other example embodiments of the light reflector may include a rear reflective surface including foamed microcellular PET plastic.

Example embodiments of the invention may include a lenticular or prismatic optical film having a structured surface with an axis of orientation that can be aligned vertically or horizontally. Certain example embodiments of the light reflector include lenticular or prismatic optical film, wherein the structured surface of the lenticular or prismatic optical film includes prisms having 90-degree prism apex angles.

Certain example embodiments of the invention may include a film-tensioning frame operable for mounting the film stack and providing tension to the film stack. In an example embodiment, corners associated with the film-tensioning frame are further operable to engage corners associated with the film stack.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A light reflector comprising:
    a rear reflective surface;
    a lenticular lens optical film comprising a smooth surface and a structured surface, wherein the smooth surface of the lenticular lens optical film is attached or disposed adjacent to the rear reflective surface; and
    a diffusion film comprising a smooth film surface and a structured diffusing surface, wherein the smooth film surface of the diffusion film is attached or disposed adjacent to the structured surface of the lenticular lens optical film.

2. The light reflector of claim 1, wherein the rear reflective surface comprises reflectivity having a total reflectance value of 90% or greater and a diffused reflectance value of 90% or greater.

3. The light reflector of claim 1, wherein the lenticular lens optical film comprises a plurality of triangular prisms.

4. The light reflector of claim 1, wherein the rear reflective surface comprises a metal.

5. The light reflector of claim 1, wherein the rear reflective surface comprises foamed microcellular PET (Polyethylene Terephthalate) plastic.

6. The light reflector of claim 1, wherein the structured diffusing surface of the diffusion film comprises a surface roughness with roughness feature height, $$h > \frac{\lambda}{8\cos(\theta)},$$

where $\lambda$=wavelength of incident light and $\theta$=angle of the incident light with respect to the bulk normal of the structured diffusing surface.

7. The light reflector of claim 1 wherein the lenticular lens optical film comprises a prismatic optical film comprising prisms having 90-degree prism apex angles.

8. A method for manufacturing a multi-layer light reflector, the method comprising:
    attaching a rear reflective layer to a lenticular lens optical film layer, wherein the lenticular lens optical film layer comprises a smooth surface and a structured surface, and wherein the rear reflective layer is disposed adjacent to or in contact with the smooth surface of the lenticular lens optical film layer; and
    attaching a diffusion layer to the lenticular lens optical film layer, wherein the diffusion layer comprises a smooth film surface and a structured diffusing surface, wherein the smooth film surface of the diffusion layer is disposed adjacent to or in contact with the structured surface of the lenticular lens optical film layer.

9. The method of claim 8, wherein the rear reflective layer comprises one or more foamed microcellular PET (Polyethylene Terephthalate) plastic sheets.

10. The method of claim 8, wherein the lenticular lens optical film layer comprises a plurality of triangular prisms.

11. The prismatic optical film of claim 10, wherein the prismatic optical film layer comprises prisms having 90 degree prism apex angles.

12. The method of claim 8, wherein the rear reflective layer comprises a metallic surface.

13. The method of claim 8, wherein attaching the rear reflective surface to the lenticular lens optical film layer comprises depositing a metal on the smooth surface of the lenticular lens optical film layer.

14. The method of claim 8, wherein the smooth surface of the lenticular lens optical film layer comprises a comprises a surface roughness with roughness feature height, $$h > \frac{\lambda}{8\cos(\theta)},$$

where $\lambda$=wavelength of incident light and $\theta$=angle of the incident light with respect to the bulk normal of the structured diffusing surface.

15. A light reflection system comprising:
    a film stack comprising:
        a rear reflective surface;
        a lenticular lens optical film comprising a smooth surface and a structured surface, wherein the smooth surface of the lenticular lens optical film is attached or disposed adjacent to the rear reflective surface; and
        a diffusion film comprising a smooth film surface and a structured diffusing surface, wherein the smooth film surface of the diffusion film is attached or disposed adjacent to the structured surface of the lenticular lens optical film; and a film-tensioning frame operable for mounting the film stack and providing tension to the film stack.

16. The system of claim 15, wherein the rear reflective surface comprises reflectivity having a total reflectance value of 90% or greater and a diffused reflectance value of 90% or greater.

17. The system of claim 15, wherein the lenticular lens optical film comprises a plurality of triangular prisms.

18. The system of claim 17, wherein the plurality of triangular prisms comprise 90-degree prism apex angles.

19. The system of claim 15, wherein the film-tensioning frame comprises at least two springs.

20. The system of claim 15, wherein the rear reflective surface comprises foamed microcellular PET (Polyethylene Terephthalate) plastic.

21. The system of claim 15, wherein the structured diffusing surface of the diffusion film comprises a surface roughness with roughness feature height, $$h < \frac{\lambda}{8\cos(\theta)},$$

where $\lambda$=wavelength of incident light and $\theta$=angle of the incident light with respect to the bulk normal of the structured diffusing surface.

22. The system of claim 15, wherein corners associated with the film-tensioning frame are further operable to engage corners associated with the film stack.

23. The system of claim 15, wherein the film-tensioning frame comprises at least two adjustable tensioners.

* * * * *

UNITED STATES PATENT AND TRADEMARK OFFICE
CERTIFICATE OF CORRECTION

| | | |
|---|---|---|
| PATENT NO. | : 8,400,714 B2 | |
| APPLICATION NO. | : 13/020541 | |
| DATED | : March 19, 2013 | |
| INVENTOR(S) | : Leslie D. Howe | |

It is certified that error appears in the above-identified patent and that said Letters Patent is hereby corrected as shown below:

Title Page,

Item (73) Assignee, delete "Atlanta, GA" as the City and State and correct to read as "Rarotonga, Cook Islands" for Country of the Assignee.

Signed and Sealed this
Eighteenth Day of June, 2013

Teresa Stanek Rea
*Acting Director of the United States Patent and Trademark Office*